United States Patent [19]
Trost et al.

[11] Patent Number: 5,296,961
[45] Date of Patent: Mar. 22, 1994

[54] DICHROIC OPTICAL FILTER

[75] Inventors: David Trost, San Francisco; Philip Baumeister, Newcastle; Dennis Fischer, Auburn, all of Calif.

[73] Assignee: Coherent, Inc., Santa Clara, Calif.

[21] Appl. No.: 690,068

[22] Filed: Apr. 23, 1991

[51] Int. Cl.$^5$ .................................................. G02B 5/28
[52] U.S. Cl. .................................. 359/359; 359/583; 359/589; 359/590
[58] Field of Search ............... 359/359, 583, 584, 589, 359/590, 636

[56] References Cited

U.S. PATENT DOCUMENTS

| | | | |
|---|---|---|---|
| 4,127,789 | 11/1978 | Kostun et al. | 359/359 |
| 4,229,066 | 10/1980 | Rancourt et al. | |
| 4,273,098 | 6/1981 | Silverstein | 359/359 |
| 4,455,479 | 6/1984 | Itoh et al. | 359/359 |
| 4,504,109 | 3/1985 | Taga et al. | 359/359 |
| 4,507,547 | 3/1985 | Taga et al. | 359/359 |
| 4,536,063 | 8/1985 | Southwell. | |
| 4,561,436 | 12/1985 | Munnerlyn | 359/636 |
| 4,583,815 | 4/1986 | Taga et al. | 359/359 |
| 4,887,592 | 12/1989 | Loertscher | 606/5 |
| 5,073,451 | 12/1991 | Iida et al. | 359/359 |

FOREIGN PATENT DOCUMENTS

| | | |
|---|---|---|
| 0080182 | 6/1983 | European Pat. Off. . |
| 2121075 | 12/1983 | United Kingdom . |

OTHER PUBLICATIONS

Japanese Abstract No. JP-A-57 058 109, vol. 6, No. 133 (P-129) Jul. 20, 1982 (Toshiba Electric Equip.) Apr. 7, 1982.

*Primary Examiner*—Martin Lerner
*Attorney, Agent, or Firm*—Limbach & Limbach

[57] ABSTRACT

A dichroic optical filter including a substrate that is substantially transparent to visible radiation, and an oxide semiconductor layer on the substrate for reflecting an infrared wavelength (such as an infrared treatment beam wavelength). An example of a suitable oxide semiconductor for reflecting a treatment beam from a $CO_2$ layer is indium tin oxide. Preferably, the filter includes a specially designed multilayer coating on the oxide semiconductor layer to enhance the reflection of infrared and longer wavelength radiation. This multilayer coating includes alternating quarter-wave layers of high and low refractive index materials, each having an optical thickness substantially equal to a quarter-wavelength of infrared radiation to be reflected. Preferably also, the multilayer coating includes a thin multilayer coating between each pair of adjacent quarter-wave layers, with these thin multilayer coatings being designed to enhance the filter's transmission of visible radiation, while not significantly affecting the filter's reflection of infrared wavelengths. Also preferably, the multilayer coating includes a second multilayer coating which reflects a narrow band of visible radiation (such as visible radiation from a HeNe laser aiming beam), while transmitting most visible wavelengths.

13 Claims, 9 Drawing Sheets

| Layer nr. | Starting design | | Final design | | Modified design | |
|---|---|---|---|---|---|---|
| | Material | Thickness, μm | Material | Thickness, μm | Material | Thickness, μm |
| | air | massive | air | massive | massive | massive |
| 1 | ThF4 | 0.03 | ThF4 | 0.0825 | PbF2 | 0.36 |
| 2 | ZnS | 0.02 | ZnS | 0.1274 | ThF4 | 0.30 |
| 3 | ThF4 | 0.03 | ThF4 | 0.0409 | PbF2 | 0.36 |
| 4 | ZnS | 0.02 | ZnS | 0.0239 | ThF4 | 0.30 |
| 5 | ThF4 | 0.03 | ThF4 | 0.0295 | PbF2 | 0.36 |
| 6 | ZnS | 0.02 | ZnS | 1.0513 | ThF4 | 0.30 |
| 7 | ThF4 | 0.03 | ThF4 | 0.0177 | PbF2 | 0.36 |
| 8a | ZnS | 0.02 | ZnS | 0.0283 | ThF4 | 0.30 |
| 8b | ZnS | 1.13 | - | - | - | - |
| 9 | ThF4 | 0.03 | ThF4 | 0.0474 | PbF2 | 0.36 |
| 10 | ZnS | 0.02 | ZnS | 0.0065 | ThF4 | 0.0825 |
| 11 | ThF4 | 0.03 | ThF4 | 1.9234 | ZnS | 0.1274 |
| 12 | ZnS | 0.02 | ZnS | 0.0143 | ThF4 | 0.0409 |
| 13 | ThF4 | 0.03 | ThF4 | 0.0587 | ZnS | 0.0239 |
| 14 | ZnS | 0.02 | ZnS | 0.0278 | ThF4 | 0.0295 |
| 15 | ThF4 | 0.03 | ThF4 | 0.0578 | ZnS | 1.0513 |
| 16 | ZnS | 0.02 | ZnS | 0.0209 | ThF4 | 0.0177 |
| 17a | ThF4 | 1.8 | ThF4 | 0.0587 | ZnS | 0.0283 |
| 17b | ThF4 | 0.03 | - | - | - | - |
| 18 | ZnS | 0.02 | ZnS | 0.0312 | ThF4 | 0.0474 |
| 19 | ThF4 | 0.03 | ThF4 | 0.0236 | ZnS | 0.0065 |
| 20 | ZnS | 0.02 | ZnS | 1.1409 | ThF4 | 1.9234 |

| Layer nr. | Starting design Material | Starting design Thickness, μm | Final design Material | Final design Thickness, μm | Modified design Material | Modified design Thickness, μm |
|---|---|---|---|---|---|---|
|  | air | massive | air | massive | massive | massive |
| 1 | ThF4 | 0.03 | ThF4 | 0.0825 | PbF2 | 0.36 |
| 2 | ZnS | 0.02 | ZnS | 0.1274 | ThF4 | 0.30 |
| 3 | ThF4 | 0.03 | ThF4 | 0.0409 | PbF2 | 0.36 |
| 4 | ZnS | 0.02 | ZnS | 0.0239 | ThF4 | 0.30 |
| 5 | ThF4 | 0.03 | ThF4 | 0.0295 | PbF2 | 0.36 |
| 6 | ZnS | 0.02 | ZnS | 1.0513 | ThF4 | 0.30 |
| 7 | ThF4 | 0.03 | ThF4 | 0.0177 | PbF2 | 0.36 |
| 8a | ZnS | 0.02 | ZnS | 0.0283 | ThF4 | 0.30 |
| 8b | ZnS | 1.13 | - | - | - | - |
| 9 | ThF4 | 0.03 | ThF4 | 0.0474 | PbF2 | 0.36 |
| 10 | ZnS | 0.02 | ZnS | 0.0065 | ThF4 | 0.0825 |
| 11 | ThF4 | 0.03 | ThF4 | 1.9234 | ZnS | 0.1274 |
| 12 | ZnS | 0.02 | ZnS | 0.0143 | ThF4 | 0.0409 |
| 13 | ThF4 | 0.03 | ThF4 | 0.0587 | ZnS | 0.0239 |
| 14 | ZnS | 0.02 | ZnS | 0.0278 | ThF4 | 0.0295 |
| 15 | ThF4 | 0.03 | ThF4 | 0.0578 | ZnS | 1.0513 |
| 16 | ZnS | 0.02 | ZnS | 0.0209 | ThF4 | 0.0177 |
| 17a | ThF4 | 1.8 | ThF4 | 0.0587 | ZnS | 0.0283 |
| 17b | ThF4 | 0.03 | - | - | - | - |
| 18 | ZnS | 0.02 | ZnS | 0.0312 | ThF4 | 0.0474 |
| 19 | ThF4 | 0.03 | ThF4 | 0.0236 | ZnS | 0.0065 |
| 20 | ZnS | 0.02 | ZnS | 1.1409 | ThF4 | 1.9234 |

| # | material | value | material | value | material | value |
|---|---|---|---|---|---|---|
| 21 | ThF4 | 0.03 | ThF4 | 0.0316 | ZnS | 0.0143 |
| 22 | ZnS | 0.02 | ZnS | 0.0177 | ThF4 | 0.0587 |
| 23 | ThF4 | 0.03 | ThF4 | 1.5792 | ZnS | 0.0278 |
| 24a | ZnS | 0.02 | ZnS | 0.0130 | ThF4 | 0.0578 |
| 24b | ZnS | 1.13 | - | - | - | - |
| 25 | ThF4 | 0.03 | ThF4 | 0.0626 | ZnS | 0.0209 |
| 26 | ZnS | 0.02 | ZnS | 0.0180 | ThF4 | 0.0587 |
| 27 | ThF4 | 0.03 | ThF4 | 0.1035 | ZnS | 0.0312 |
| 28 | ZnS | 0.02 | ZnS | 0.0143 | ThF4 | 0.0236 |
| 29 | ThF4 | 0.03 | ThF4 | 0.0433 | ZnS | 1.1409 |
| 30 | ZnS | 0.02 | ZnS | 0.0628 | ThF4 | 0.0316 |
| 31 | ThF4 | 0.03 | ITO | 0.0669§ | ZnS | 0.0177 |
| 32 | ZnS | 0.02 | | substrate | ThF4 | 1.5792 |
| 33a | ThF4 | 1.8 | | | ZnS | 0.0130 |
| 33b | ThF4 | 0.03 | | | - | - |
| 34 | ZnS | 0.02 | | | ThF4 | 0.0626 |
| 35 | ThF4 | 0.03 | | | ZnS | 0.0180 |
| 36 | ZnS | 0.02 | | | ThF4 | 0.1035 |
| 37 | ThF4 | 0.03 | | | ZnS | 0.0143 |
| 38 | ZnS | 0.02 | | | ThF4 | 0.0433 |
| 39 | ThF4 | 0.03 | | | ZnS | 0.0628 |
| 40 | ZnS | 0.02 | | | ITO | 0.0669 |
| 41 | ITO | 0.0669 | | | | |
| | substrate | massive | | | | substrate / massive |

DICHROIC OPTICAL FILTER

FIELD OF THE INVENTION

This invention relates to dichroic optical filters. More particularly, the invention relates to dichroic optical filters that reflect selected infrared radiation while transmitting most wavelengths of the visible spectrum.

BACKGROUND OF THE INVENTION

The dichroic optical filter of the invention is particularly useful when embodied in a surgical operating microscope micromanipulator. Such a micromanipulator is an attachment to a surgical operating microscope which allows a surgeon to manipulate a high power laser beam (typically superimposed with a visible, coherent, aiming beam) while viewing a patient and the aiming beam through the microscope.

The principal optical components of a surgical operating microscope (with micromanipulator) are shown schematically in FIG. 1. The central element in the micromanipulator is beam combining optic 4 (sometimes denoted herein as "combiner" 4). Coherent beam source 2 (which may include one or more lasers) emits high power coherent beam 12 and visible, coherent aiming beam 14. Beam 12 is typically an infrared beam having wavelength 10.6 micrometers (from a $CO_2$ laser). Aiming beam 14 is typically a visible beam from an HeNe laser having wavelength 0.6328 micrometers, although in alternative embodiments beam 14 can have any of a variety of other visible wavelengths (such as 0.543 micrometers). Beam 12 will sometimes be referred to herein as the "operating" or "treatment" beam. Operating beam 12 and aiming beam 14 are incident on patient 10 after they reflect from combiner 4.

Visible radiation 16 reflects from patient 10 and propagates through combiner 4 to microscope objective lenses 6 and 8. Two objective lenses 6 and 8 are shown to indicate that the microscope is binocular. Portion 14a of aiming beam 14 also reflects from patient 10 and propagates through combiner 4 to lenses 6 and 8. In this way, a surgeon may view the radiation transmitted through lenses 6 and 8 to determine the portion of patient 10 from which beam 14a has reflected.

Portion 12a of operating beam 12 reflects from patient 10, and then reflects from combiner 4 in a direction away from microscope objective lenses 6 and 8. In this way, combiner 4 prevents damage to the surgeon's eyes while the surgeon views radiation (14a and 16) transmitted through combiner 4.

In one conventional variation on the system of FIG. 1, combiner 4 is replaced by a substantially 100% reflective mirror that is mounted in a position offset from the path of visible radiation 16 from patient 10 to lenses 6 and 8. An important disadvantage of this type of conventional system is that it introduces parallax between the viewing light (reflected radiation 16) and the treatment radiation. This parallax makes it difficult or impossible for a surgeon to view and treat at the same time inside a restricted orifice of a patient's body (or through a hollow instrument inserted into such orifice).

In another type of conventional system, combiner 4 is replaced by a small, 100% reflective mirror. By symmetrically positioning such mirror between lenses 6 and 8 and patient 10, parallax is eliminated. However, the constraints on the size of the mirror in such a system render the system unsuitable for many applications. The mirror must be sufficiently small so as not to obstruct unduly the surgeon's view of the patient. Yet, the mirror must not be so small that diffraction effects prevent it from directing the treatment and aiming beams to a sufficiently small focal spot on the patient. Due to diffraction effects, the smallest spot achievable at the focus of the treatment and aiming beams is inversely proportional to the size of the reflecting mirror. Extremely small spot size is highly desirable for some forms of treatment, and yet cannot be achieved with this type of conventional system.

In yet another conventional system, combiner 4 of FIG. 1 is implemented as a dichroic filter, which transmits visible wavelengths (i.e., visible radiation 16 and visible aiming beam 14a) and reflects the treatment beam wavelength. With this approach it is possible to make the dichroic filter large (to achieve sufficiently small treatment beam spot size) and still keep the dichroic filter on the optical axis (for parallax control). One such conventional dichroic filter, suitable for use with a $CO_2$ laser treatment beam having 10.6 micrometer wavelength, is filter 20 shown in FIG. 2.

Filter 20 is an "enhanced transmission" filter consisting of transparent glass substrate 20, thin dielectric layer 24 coated on substrate 20, thin gold layer 26 coated on layer 24, and thin dielectric layer 28 coated on gold layer 26. Gold layer 26 efficiently reflects 10.6 micrometer radiation.

The tendency of gold layer 26 to reflect visible radiation is partially overcome by dielectric layers 24 and 28, which produce a standing wave in the visible band, with an antinode at gold layer 26. The net effect is to enhance the transmission of visible radiation through filter 20.

Because coating layers 24, 26, and 28 would not efficiently reflect visible aiming beam 14 to the patient, it is conventional to include a small aluminized reflecting spot 29 (shown in FIG. 3) in the center of filter 20. Typically, filter 20 is mounted symmetrically with respect to the microscope objective lenses (6 and 8), so that spot 29 is symmetrically positioned relative to the objective lenses as shown in FIG. 3. However, if spot 29 is small enough not to interfere with the microscope user's view, it tends to produce an imperfect aiming spot in the field of view (due to the diffractive effect discussed above, and to loss of light). Furthermore, a typical spot 29 interferes with the microscope user's view of the patient, particularly when the microscope is operated at low magnifications.

For this reason, aluminized reflecting spot 29 and the aiming beam are sometimes omitted. Instead, a separate aiming spot is developed and projected into the microscope field of view as either a real or virtual image. However, it is difficult to keep such separate aiming spot aligned with the treatment beam.

Conventional enhanced transmission filter 20 (of FIGS. 2 and 3) has a number of additional serious limitations and disadvantages. For example, coatings 24, 26, and 28 attenuate a significant fraction of visible radiation incident thereon. Furthermore, gold does not adhere well to the usual dielectric materials employed as layers 24 and 28. Thus, coating layers 28 and 26 do not stand up well to the rugged environment of the operating room, and to subsequent cleaning.

The invention avoids the described limitations and disadvantages of conventional micromanipulator beam combining optics, by employing an oxide semiconductor coating (such as a layer of indium tin oxide) on a substrate (a substrate transparent to visible radiation), to reflect the treatment beam wavelength (or wavelengths) while efficiently transmitting visible wavelengths. Oxide semiconductor layers, such as layers of indium tin oxide ("ITO") have been used as transparent electrodes in electro-optical devices such as cathode ray and liquid crystal displays. However, until the present invention it had not been known to employ a transparent substrate with an oxide semiconductor coating as a dichroic filter, for such applications as use in a micromanipulator beam combining optic.

SUMMARY OF THE INVENTION

The inventive optical filter is a dichroic optical filter including a substrate that is transparent to visible radiation, and an oxide semiconductor layer on the substrate for reflecting an infrared wavelength (such as an infrared treatment beam wavelength). An example of a suitable oxide semiconductor for reflecting a treatment beam from a $CO_2$ layer is indium tin oxide ("ITO").

In a class of preferred embodiments, the filter of the invention includes a specially designed multilayer coating on the oxide semiconductor layer to enhance the filter's reflection of infrared and longer wavelength radiation. This multilayer coating includes alternating quarter-wave layers of high and low refractive index materials (each having an optical thickness substantially equal to a quarter-wavelength of infrared radiation to be reflected). Preferably also, the multilayer coating includes a thin multilayer coating between each pair of adjacent quarter-wave layers, with these thin multilayer coatings being designed to enhance the transmittance of the inventive filter to visible radiation, while not significantly affecting the filter's reflection of infrared wavelengths.

Also preferably, the multilayer coating includes a second multilayer coating for partially reflecting a narrow band of visible radiation (such as visible radiation from a HeNe laser aiming beam), while efficiently transmitting wavelengths of the visible spectrum outside such narrow band.

BRIEF DESCRIPTION OF THE DRAWINGS

FIG. 12 is a table defining three embodiments of substrate 32, layer 34, and coating 36, of the filter of FIG. 4.

DETAILED DESCRIPTION OF THE PREFERRED EMBODIMENTS

Figure 4:
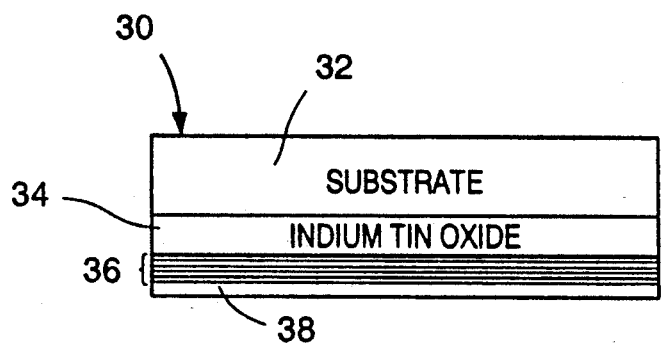
FIG. 4 is a side cross-sectional view of an optical filter embodying the invention, which consists of substrate 32, coating layer 34, first multilayer coating 36, and second multilayer coating 38.

FIG. 4 is a side cross-sectional view of a preferred embodiment of the inventive dichroic filter. Substrate 32 is preferably composed of an optical filter glass (such as fused silica or BK-7 glass). Layer 34 coated on substrate 30, is composed of an oxide semiconductor that reflects infrared (and longer wavelength) radiation while transmitting visible radiation. For reflecting infrared treatment beam radiation having wavelength 10.6 micrometers (from a $CO_2$ laser), the oxide semiconductor comprising layer 34 may be indium tin oxide. In alternative embodiments, layer 34 may be composed of other oxide semiconductors, such as CdO or $SnO_2$, for example.

Use of an oxide semiconductor for layer 34 is superior to use of gold (as in some conventional dichroic filters) since oxide semiconductors are available that transmit visible radiation more efficiently and over a broader visible frequency range than gold (even when the gold is used with additional visible radiation transmission enhancement layers of the type described above with reference to FIG. 2), are more rugged than gold, and adhere better to typical substrates than does gold. Oxide semiconductor layer 34 should be applied with carefully controlled deposition parameters in order to achieve the desired optical properties.

For specificity, oxide semiconductor layer 34 will be referred to below as "ITO" layer 34, since layer 34 is composed of indium tin oxide in the preferred embodiment of the invention mentioned above.

First multilayer coating 36 is coated on ITO layer 34, and second multilayer coating 38 is coated on coating 36. Coating 36 is designed so that the sequence of its layers (and the optical thickness of each layer) is such that coating 36 reflects infrared radiation while having minimal impact on the transmission of visible radiation. Each individual layer of multilayer coating 36 is preferably composed of material that is transparent in both the visible and the infrared.

Narrow visible band reflecting multilayer coating 38 should be made out of materials that are transparent in the visible and the infrared, and should be designed to partially reflect incident visible aiming beam radiation (in the typical case, the aiming beam radiation does not have significant frequency components outside a narrow visible frequency band). Coating 38 preferably reflects 40% to 60% of the power of incident radiation in the narrow visible band. Coating 38 should not totally reflect the radiation in the narrow visible band since the microscope user needs to receive some of this visible radiation (that has passed through the inventive filter after reflecting from the patient). It is desirable that coating 38 has minimal impact on transmission of visible radiation outside the narrow visible band of the aiming beam, to avoid unnecessarily distorting the image of the patient observed by the microscope user.

In some embodiments of the invention, one or both of coatings 36 and 38 are omitted. However, without coating 36, an indium tin oxide layer 34 will absorb approximately 20% of the power of an incident 10.6 micrometer treatment beam. In the typical case that the treatment beam is a high power laser beam, this rate of power absorption is unacceptably high, and will drastically shorten the useful operating life of the filter. For most applications (including virtually all high power applications), the invention must include coating 36 to reflect enough infrared treatment beam radiation to prevent filter damage due to excessive power absorption.

Figure 5:
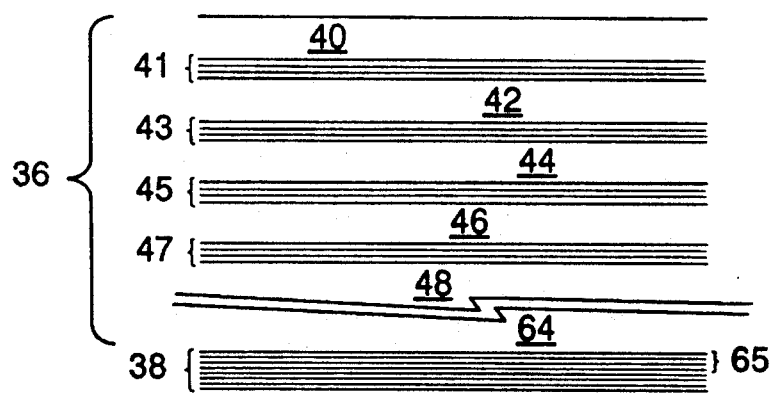
FIG. 5 is a side cross-sectional view of a portion of an embodiment of multilayer coatings 36 and 38 of FIG. 4.

FIG. 5 is an enlarged view of a portion of a preferred embodiment of multilayer coatings 36 and 38 of FIG. 4 (the top and bottom layers of coating 36 are shown in FIG. 5, but the inner layers are omitted to simplify the drawing). The FIG. 5 embodiment of coating 36 includes thick, high refractive index layers alternating with thick, low refractive index layers. In FIG. 5, the thick layers are in the following order: thick high index layer 40, thick low index layer 42, thick high index layer 44, thick low index layer 46, thick high index layer 48, several layers not shown, and thick low index layer 64. Each of thick layers 40, 42, 44, 46, 48, and 64 has an optical thickness substantially equal to quarter the wavelength of the principal wavelength of infrared treatment beam 12. Accordingly, the thick layers will sometimes be referred to herein as "quarter-wave layers".

The number of quarter-wave layers coated on substrate 32 will depend on the desired optical properties of the filter. The invention in its broadest scope is not limited a filter having any specific number of layers. There may be an even number or odd number of layers. The layer (layer 40 in FIG. 5) nearest the substrate may be a member of the subset having high refractive index or may be a member of the subset having low refractive index.

A Fresnel reflection naturally occurs at the index discontinuity between the thick layers. Because of the controlled (substantially quarter-wave) optical thickness of each layer, the multiple reflections interfere constructively. The resulting coherent addition of the multiple reflections is far greater than the simple sum of the reflections from each interface. As a result, multilayer stack 36 increases the reflectivity of the inventive filter (to the infrared wavelength of interest) to 95% or more, whereas the reflectivity of oxide semiconductor 34 alone is typically about 80%.

However, an embodiment of IR reflection enhancement stack 36 including thick layers only (i.e., only layers 40, 42, 44, 46, etc.), and not thin multilayer stacks 41, 43, 45, etc., tends undesirably to interfere significantly with transmission of visible radiation. This effect can be understood as follows. If each thick layer has about quarter the thickness of a 10.6 micrometer infrared treatment beam, the optical thickness of each such layer is anywhere from 15 to 26 wavelengths in the visible band. As one scans the visible band, there will be a series of eleven (or so) reflectivity peaks and valleys, as IR reflection enhancement stack 36 alternately acts as a reflection and transmission enhancer in the visible.

To enhance the transmissivity of the inventive filter in the visible, a thin multilayer stack (comprising alternating high and low refractive index materials) is inserted at the interface between each pair of adjacent thick layers. For example, thin stack 41 is inserted between thick layers 40 and 42. Insertion of such "thin" stacks serves to enhance the transmittance in the visible portion of the spectrum and hence the thin stacks are termed "visible transmittance enhancement stacks" in subsequent discussion. The following computer modelling procedure was used to design each visible transmittance enhancement stack: (1) a group of rather thin stacks (each having alternating high and low refractive indices) was interdispersed between each of the thicker layers of stack 36; and (2) the thicknesses of the thin stack layers were adjusted with the goal of optimizing the transmittance in the visible portion of the spectrum. The word "thin" in the foregoing sentence means that the optical thickness of each thin stack does not exceed 200 nm—i.e., one eighth of a wave in the visible part of the spectrum.

As an example, a design that fulfills step (1) in the foregoing paragraph may be written symbolically as air S H S L S H S L S T substrate where H and L represent "thick" layers of a quarter-wave in the infrared. T represents an indium tin oxide layer that is thick enough to reflect well in the infrared, yet not so thick as to reduce substantially the visible transmittance by its absorption. Interdispersed between each of the "thick" layers is the stack S of thin layers, of the design $(H' L')^4$ where H' and L' represent layers of optical thickness 50 nm, which is substantially thinner than any wavelength in the visible part of the spectrum. The transmittance of such a stack is shown as curve "S" of FIG. 11. Such design has severe, undesirable, oscillations in the transmittance in the visible. The design of this coating (containing 41 layers) is listed in Table 1 of FIG. 12 as the "Starting design." The layer thicknesses are metric in this Table.

Figure 11:
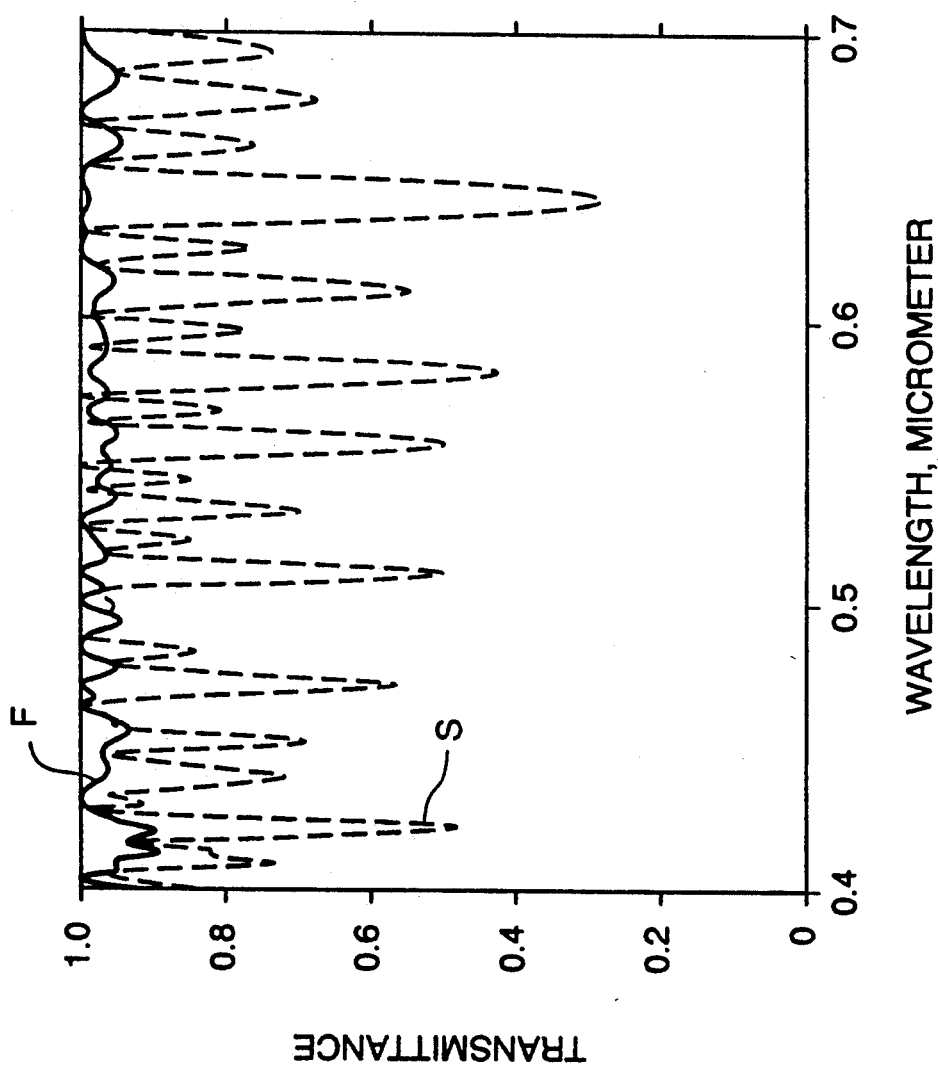
FIG. 11 is a graph showing the transmittances of the multilayer stacks identified as the "starting design" and the "final design" in FIG. 12.

The thicknesses of the layers were then adjusted. The procedures for doing this are well documented in the technical literature (see, for example, the teachings of J. A. Dobrowolski in an article entitled "Completely automated synthesis of optical thin film systems" appearing in volume 4, page 937 of the periodical Applied Optics). The "Final design" identified in Table 1 of FIG. 12 shown the metric thicknesses of the layers in the stack after this adjustment has occurred. Ten layers have been dropped from the stack. The number of "thin layers" between the "thick layers" has been reduced from eight to as few as two. Curve "F" of FIG. 11 shows that the visible transmittance of the "Final design" is considerably better than that of the "Starting design."

If each thin stack has a total optical thickness much less than the thickness of each thick layer, the thin stacks will have negligible effect on the IR reflection enhancing properties of stack 36.

In one illustrative embodiment of the invention, multilayer stack 36 includes N quarter-wave (thick) layers, and N−1 thin multilayer stacks between the thick layers. The odd quarter-wave layers 40, 44, 48, etc., are high refractive index layers composed of zinc sulfide (ZnS) and the even quarter-wave layers (42, 46, etc.) are low refractive index layers composed of thorium fluoride (ThF$_4$). The thin stacks can also be composed of alternating layers of zinc sulfide and thorium fluoride. It should be recognized that other high and low refractive index material may be substituted for the mentioned materials, provided the substitute materials are transparent in both the visible and infrared. Zinc sulfide and thorium fluoride are the most commonly used and best understood pair of high and low refractive index materials suitable for use in the inventive filter (to reflect 10.6 micrometer infrared radiation).

The quarter-wave layers in stack 36 need not all have identical refractive index, and their optical thickness need not all equal exactly one quarter wavelength of a single selected electromagnetic wave.

Figure 6:
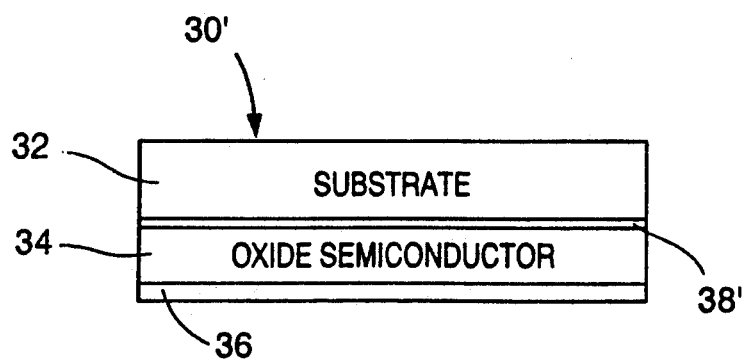
FIG. 6 is a side cross-sectional view of a variation on the optical filter of FIG. 4.

FIG. 6 is a side cross-sectional view of a variation on the optical filter of FIG. 4. Filter 30' of FIG. 6 differs from filter 30 of FIG. 4 only in that narrow-band visible reflective coating 38' of filter 30' is coated directly on substrate 32 (and ITO layer 32 is subsequently coated on coating 38'), while narrow-band reflective coating 38 of filter 30 is coated on multilayer coating 36 (after coating 36 has been applied directly to substrate 32).

Figure 1:
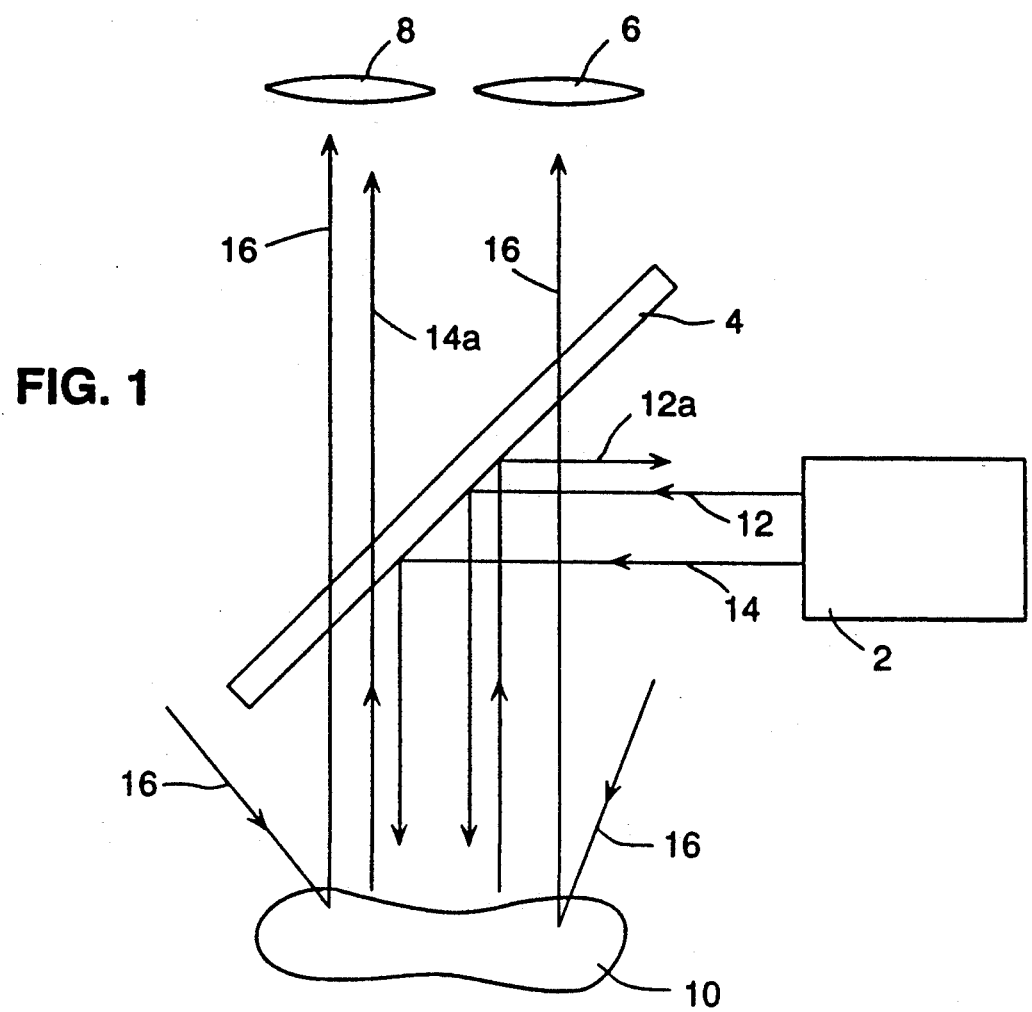
FIG. 1 is a schematic diagram of a system of the type which may embody the optical filter of the invention.
Figure 2:
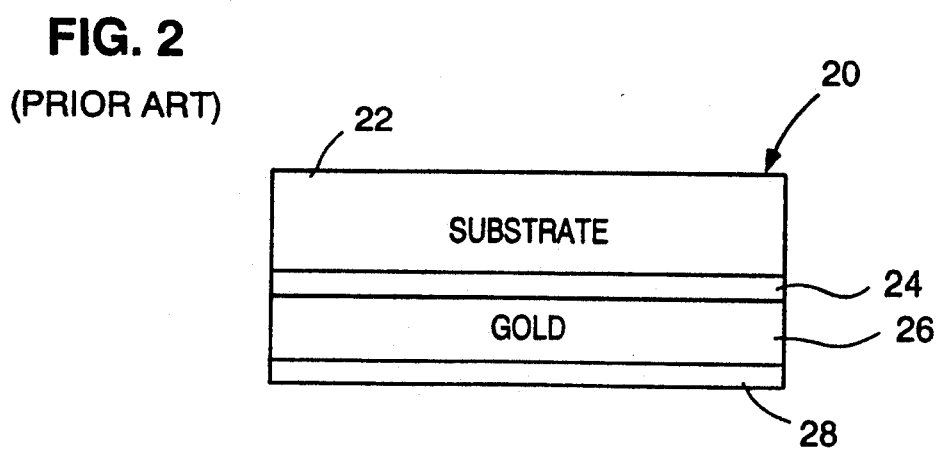
FIG. 2 is a cross-sectional view of a conventional optical filter, which consists of substrate 22 and coating layers 24, 26, and 28.
Figure 3:
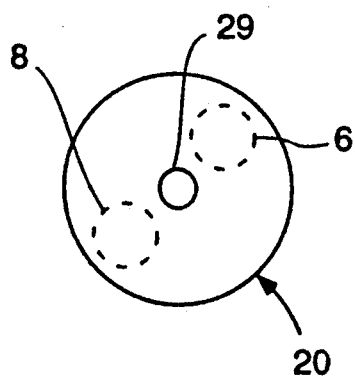
FIG. 3 is a top view of the filter shown in FIG. 2, in a preferred position relative to lenses 6 and 8 (shown in phantom view).

When using inventive filter 30 (of FIG. 4) or inventive filter 30' (of FIG. 6) in the FIG. 2 system as a substitute for combiner 4, the filter side opposite substrate 32 should face treatment beam source 2 (so that coating 38 receives radiation directly from source 2 in filter 30, and coating 36 receives radiation directly from source 2 in filter 30'). The principle advantage of filter 30' over filter 30 is that coating 38 of filter 30 must not absorb significant treatment beam radiation, while coating 38' of FIG. 6 may or may not be a good absorber of the treatment beam radiation (since virtually all the treatment beam radiation will have reflected from coatings 34 and 36 before reaching coating 38'). For most applications, it is much more practical (simpler and less expensive) to implement a suitable filter 30' than to implement a suitable filter 30.

For this reason, selection of materials for coating 38' is much easier, since they need not be transparent at 10.6 micrometers. In one illustrative example, coating 38' is composed of alternating layers of aluminum oxide (Al$_2$O$_3$) and silicon dioxide (SiO$_2$), which are good choices because of their ease of deposition, good transparency in the visible, and durability.

The design of each of the preferred embodiments of the invention is determined using an iterative optimization technique as follows: the optical constants of the substrate and coating materials are specified; the desired reflectance or transmittance spectrum is specified; and then each coating layer thickness is determined using the iterative technique. To insure the filter is conveniently and repeatably manufactured, each layer's optical thickness must be within a specified tolerance of the optimal optical thickness, so that any small variations in each layer's thickness will not significantly alter the filter's reflectance and transmittance curves. Those of ordinary skill in the art will be familiar with, and capable of performing such an iterative optimization operation, as a matter of routine design. The operation will typically include the steps of choosing a merit function, and then minimizing the merit function utilizing an optimization routine, to determine the optimal set of design parameters. For example, U.S. Pat. No. 4,536,063, issued Aug. 20, 1985 to Southwell (which patent is incorporated herein by reference), discusses the manner in which an optical coating design merit function may be chosen, and then minimized, to generate a desired optical coating design.

Figure 7:
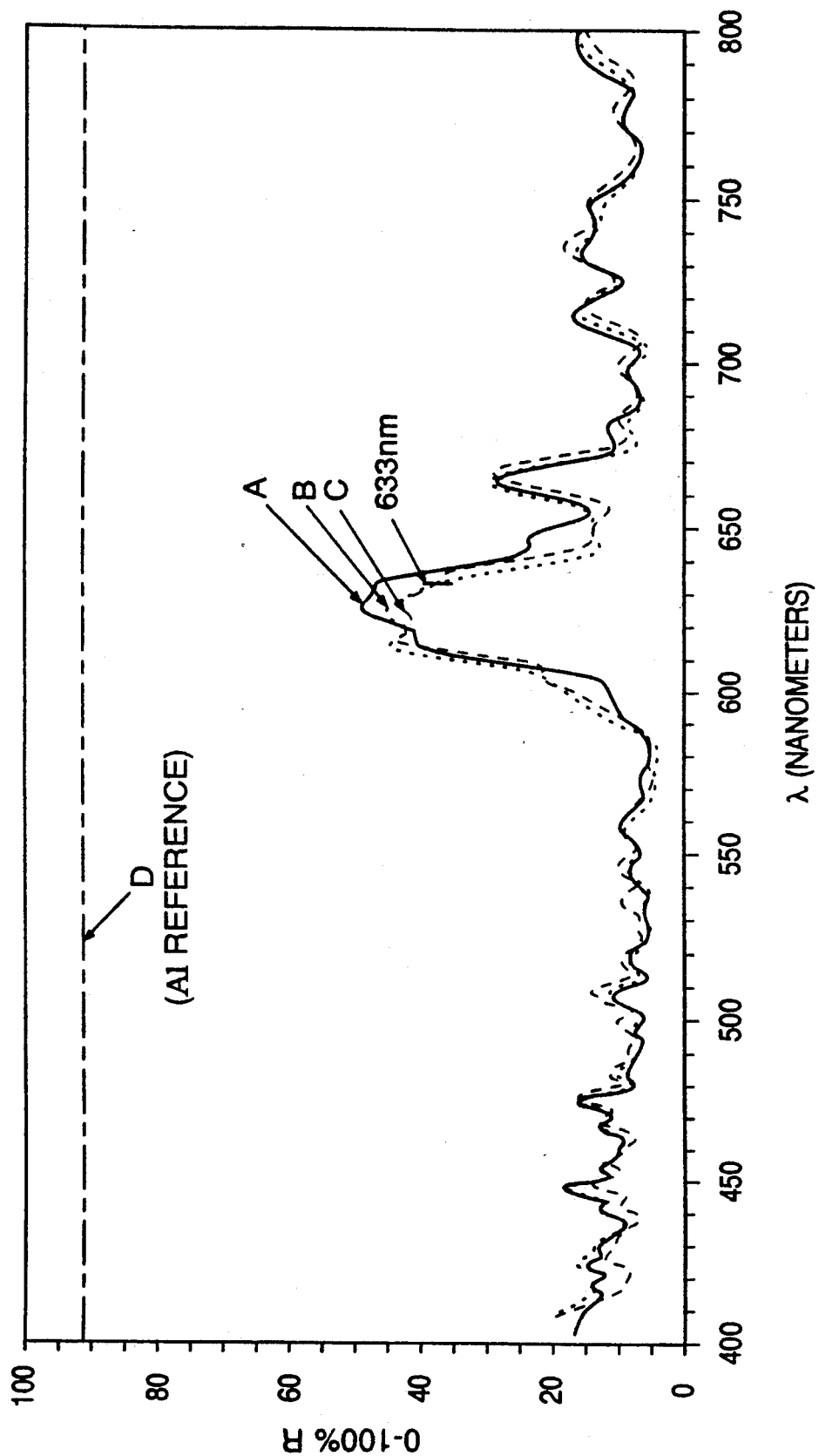
FIG. 7 is a graph showing the reflectance characteristics of a first preferred embodiment of the inventive optical filter. Distance above the horizontal axis represents reflectance (in units of percent). Distance from the vertical axis represents wavelength in units of nanometers.

FIG. 7 shows the reflectance characteristics of a first preferred embodiment of the invention which consists of a narrow band multilayer reflective coating 38' (having 14 alternating layers of alumna and silica, each having an optical thickness $3\lambda_o/4$, where $\lambda_o = 633$ nm) on a fused silica substrate 32, an indium tin oxide layer 34 having an optical thickness of 120 nm on coating 38', and a multilayer coating 36 on layer 34. Coating 36 consists of a total of 17 layers, including four alternating "thick" layers of thorium fluoride and zinc sulfide, and has an optical thickness of approximately a quarter wave at 10.6 micrometers. The outermost layer can be MgF$_2$ to increase the mechanical durability of the coating.

In FIG. 7, reflectance curves A, B, and C represent measurements of the reflectance of three different examples of the filter over the wavelength range from 400 nm to 800 nm, while reflectance curve D represents the measured reflectance of a reference aluminum mirror over the same wavelength range. Curves A, B, and C show that the filters have low reflectance in the visible, except that they have a substantial reflectance (in the range from about 40% to about 50%) over the narrow band from about 610 nm to about 636 nm.

Figure 8:
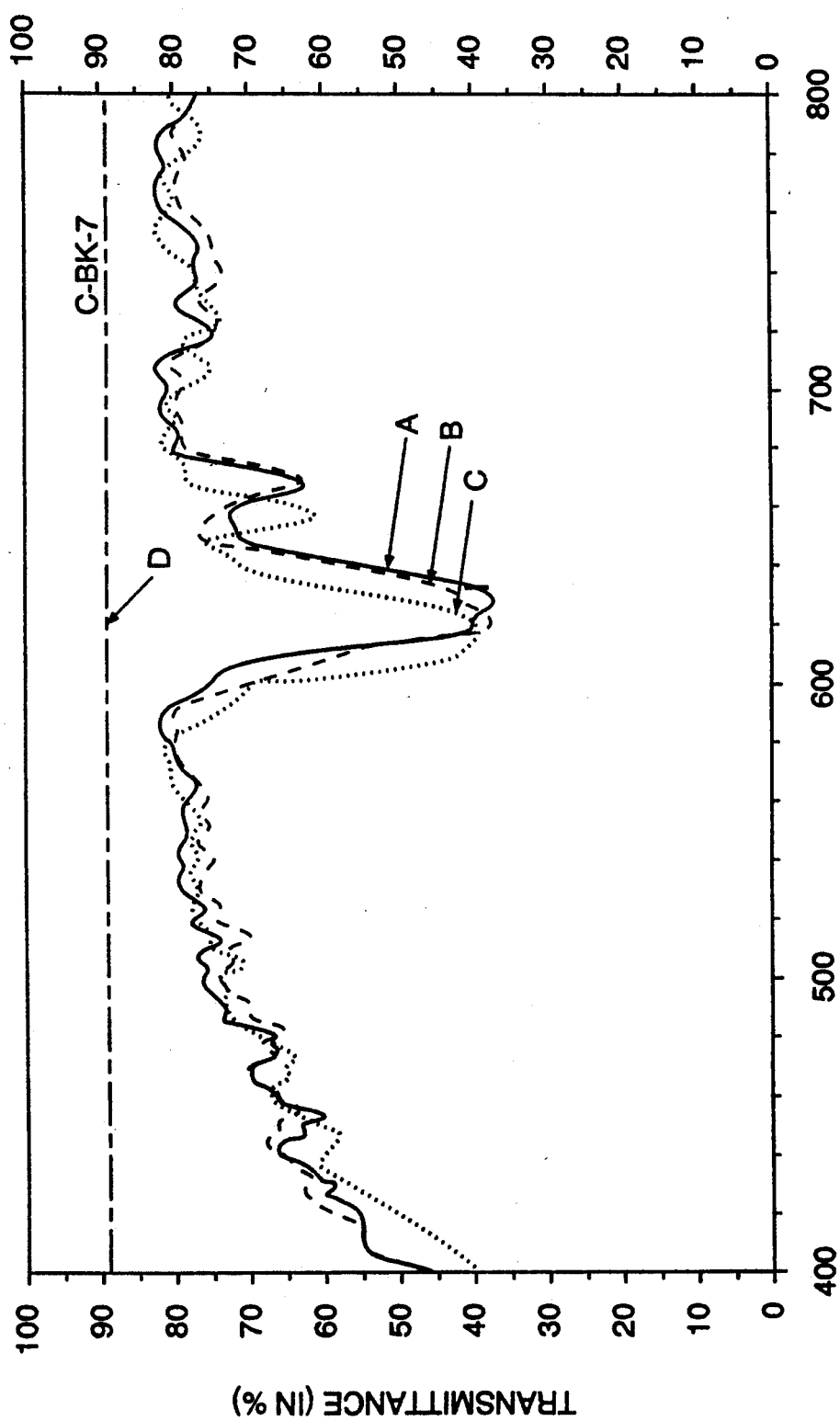
FIG. 8 is a graph showing the transmittance of the first preferred embodiment of the inventive filter as a function of wavelength (in nanometers). Distance above the horizontal axis represents transmittance (in units of percent).

FIG. 8 shows the measured transmittance of the same filters that were measured to generate reflectance curves A, B, and C of FIG. 7. In FIG. 8, transmittance curves A, B, and C represent the measured transmittance of the same three examples of the filter over the wavelength range from 400 nm to 800 nm, while curve D represents the measured transmittance of a reference transparent substrate (composed of fused silica) over the same wavelength range. Curves A, B, and C show that the filters are highly transmissive in the visible, except that they have low transmittance (about 40%) over the narrow band from about 620 nm to about 636 nm.

Figure 9:
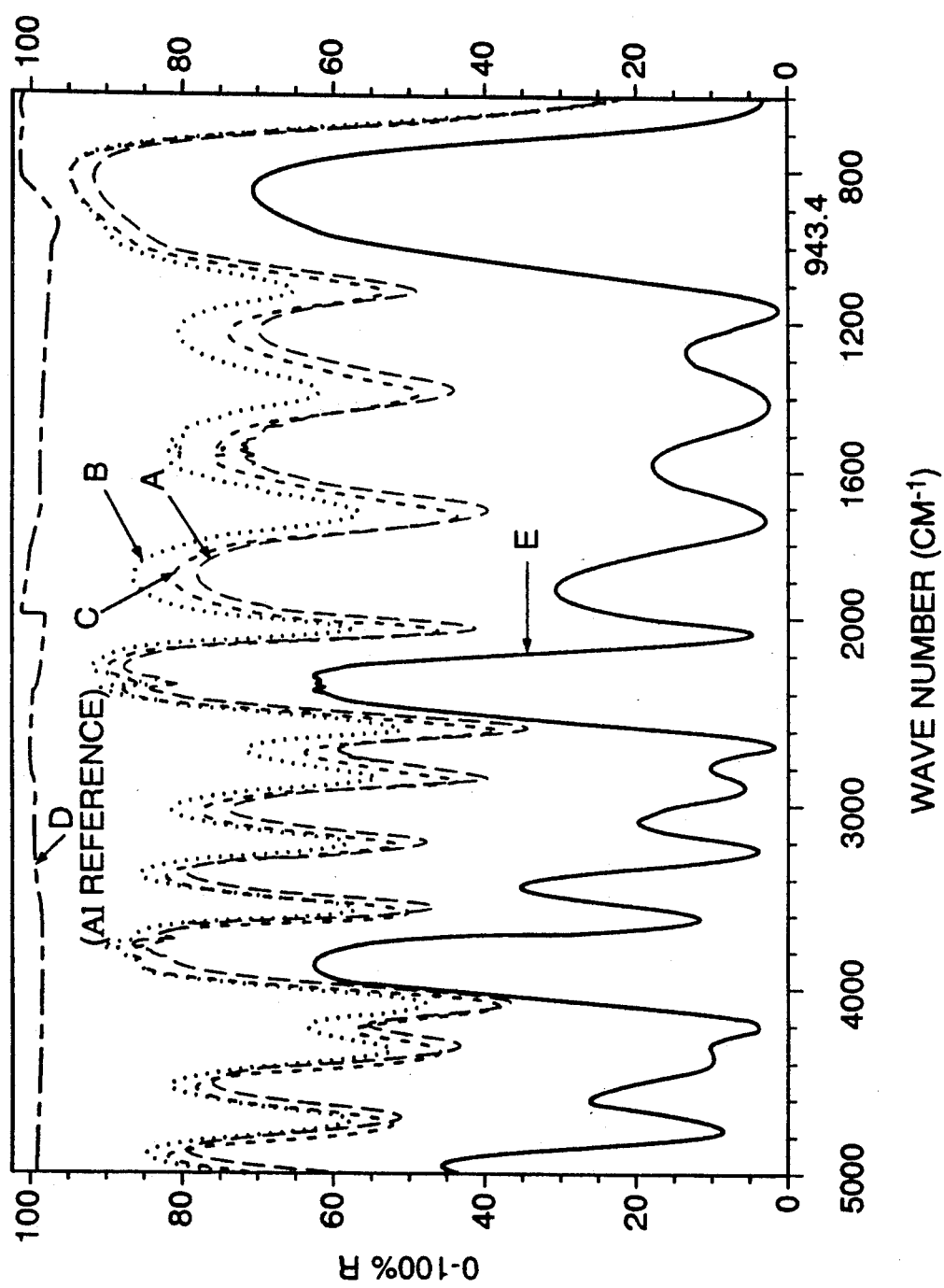
FIG. 9 is a graph showing the reflectance characteristics of the first preferred embodiment of the inventive filter. Distance above the horizontal axis represents reflectance (in percent). Distance from the vertical axis represents wavenumber in units of inverse centimeters.

FIG. 9 is a graph showing the measured reflectance of the same filters measured to generate reflectance curves A, B, and C of FIG. 7. In FIG. 9, curves A, B, and C represent measurements of filter reflectance over the wavenumber range from 5000 to 600 inverse centimeters. Curve D represents the measured reflectance of a reference aluminum mirror, and curve E represents the measured reflectance of a reference ZnSe wedge, over the same wavenumber range. Curves A, B, and C show that the filters have high reflectance to infrared radiation with a wavenumber 943.4 inverse centimeters (which corresponds to a 10.6 micrometer wavelength).

Figure 10:
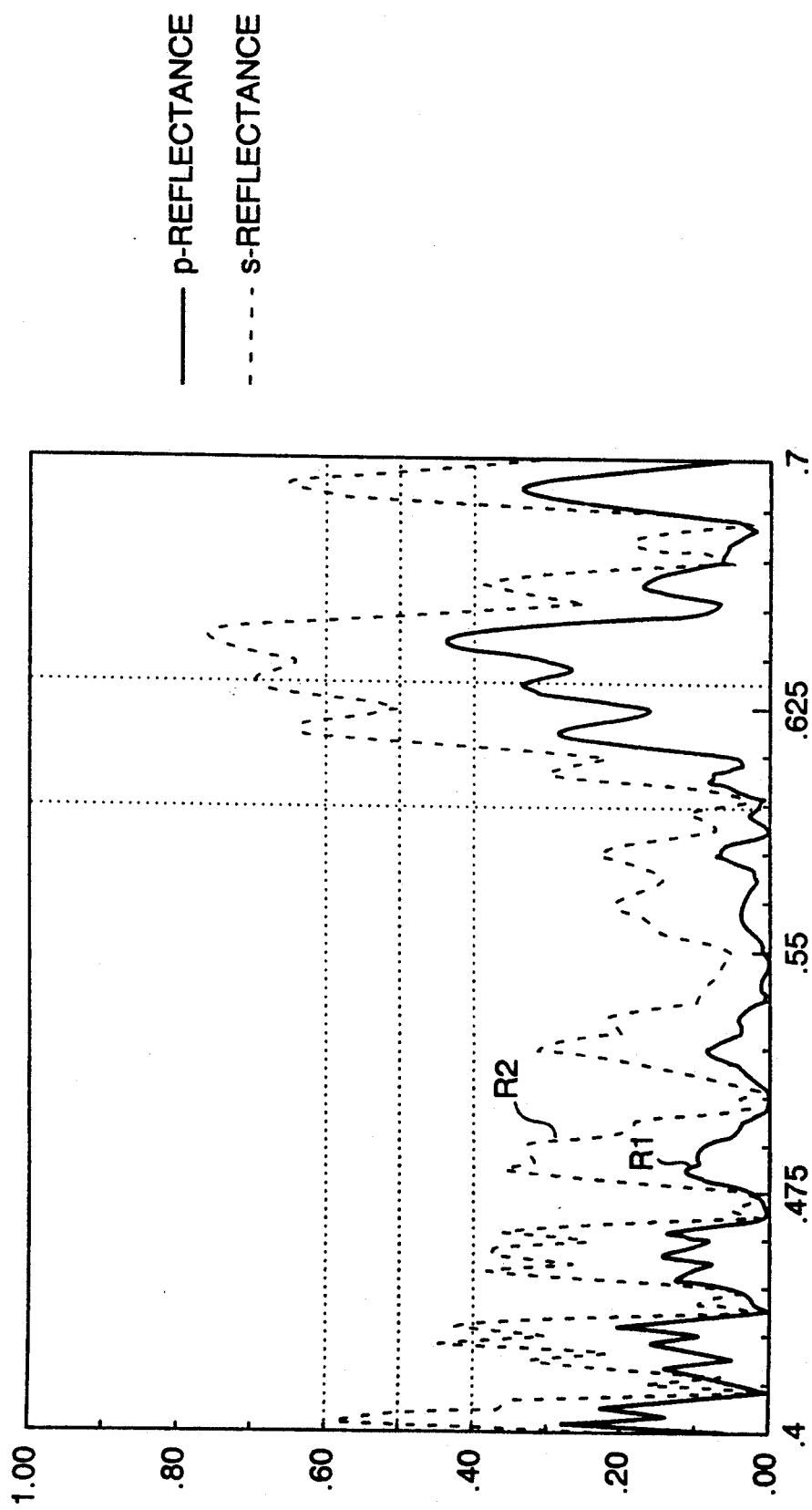
FIG. 10 is a graph showing the reflectance and transmittance characteristics of a second preferred embodiment of the inventive filter. Distance from the vertical axis represents wavelength in micrometers.

FIG. 10 is a graph showing the predicted reflectance and transmittance characteristics of a second preferred embodiment of the invention. Its design is listed as the "modified design" in Table 1 of FIG. 12. The 633 nm reflector consists of nine alternating layers of lead floride and thorium floride.

Curve R1 of FIG. 10 represents the p-reflectance of the second preferred embodiment, and curve R2 represents the s-reflectance of the second preferred embodiment.

The above description is merely illustrative of the invention. Various changes in the details of the materials and designs described may be within the scope of the appended claims.

What is claimed is:

1. A dichroic optical filter, including:

a substrate that is substantially transparent to visible radiation, wherein the substrate has a front surface;

a coating on the front surface, wherein the coating includes:

an oxide semiconductor layer that is highly reflective to a selected infrared wavelength and is substantially transparent to visible radiation; and a first multilayer coating for enhancing the filter's reflectance to the selected infrared wavelength, wherein the first multilayer coating includes thick layers having a higher refractive index alternating with thick layers having a lower refractive index, wherein each of the thick layers has an optical thickness substantially equal to one quarter of the selected infrared wavelength, and wherein each of the thick layers is substantially transparent to visible radiation, wherein the first multilayer coating also includes:

a plurality of thin layers between each adjacent pair of thick layers, wherein the thin layers in each said plurality of thin layers have optical thicknesses and refractive indices selected so that said plurality of thin layers enhances the filter's transmission of visible radiation without significantly affecting the filter's reflection of the selected infrared wavelength.

2. A dichroic optical filter, including:

a substrate that is substantially transparent to visible radiation, wherein the substrate has a front surface;

a coating on the front surface, wherein the coating includes:

an oxide semiconductor layer that is highly reflective to a selected infrared wavelength and is substantially transparent to visible radiation; and a first multilayer coating for enhancing the filter's reflectance to the selected infrared wavelength, wherein the first multilayer coating includes thick layers having a higher refractive index alternating with thick layers having a lower refractive index, wherein each of the thick layers has an optical thickness substantially equal to one quarter of the selected infrared wavelength, and wherein each of the thick layers is substantially transparent to visible radiation, wherein the coating also includes a second multilayer coating that partially reflects a narrow wavelength band of visible radiation, and is highly transmissive to visible wavelengths outside the narrow wavelength band.

3. The filter of claim 2, wherein the second multilayer coating is contiguous with the substrate.

4. The filter of claim 2, wherein the first multilayer coating is between the second multilayer coating and the oxide semiconductor layer.

5. A dichroic optical filter, including:

a substrate that is substantially transparent to visible radiation, wherein the substrate has a front surface;

a coating on the front surface, wherein the coating includes:

an oxide semiconductor layer that is highly reflective to a selected infrared wavelength and is substantially transparent to visible radiation; and a first multilayer coating for enhancing the filter's reflectance to the selected infrared wavelength, wherein the first multilayer coating includes thick layers having a higher refractive index alternating with thick layers having a lower refractive index, wherein each of the thick layers has an optical thickness substantially equal to one quarter of the selected infrared wavelength, and wherein each of the thick layers is substantially transparent to visible radiation, wherein the selected infrared wavelength is 10.6 micrometers.

6. A micromanipulator system, including:

a source of coherent radiation; and a beam combining optic positioned to receive the coherent radiation, and comprising a substrate having a front surface and a coating on the front surface, wherein the substrate is substantially transparent to visible radiation, wherein the coating includes an oxide semiconductor layer, and wherein the oxide semiconductor layer is highly reflective to a selected infrared wavelength and substantially transparent to visible radiation, wherein the coating also includes:

a first multilayer coating for enhancing the reflectance of the beam combining optic to the selected infrared wavelength, wherein the first multilayer coating includes thick layers having a higher refractive index alternating with thick layers having a lower refractive index, wherein each of the thick layers has an optical thickness substantially equal to one quarter of the selected infrared wavelength, and wherein each of the thick layers is substantially transparent to visible radiation, and wherein the first transparent to visible radiation, and wherein the first multilayer coating also includes:

a plurality of thin layers between each adjacent pair of thick layers, wherein the thin layers in each said plurality of thin layers have optical thicknesses and refractive indices selected so that said plurality of thin layers enhances the filter's transmission of visible radiation without significantly affecting the filter's reflection of the selected infrared wavelength.

7. The system of claim 6, wherein the coating also includes a second multilayer coating that partially reflects a narrow wavelength band of visible radiation, and is highly transmissive to visible wavelengths outside the narrow wavelength band.

8. The system of claim 7, wherein the second multilayer coating is contiguous with the substrate.

9. The system of claim 7, wherein the first multilayer coating is between the second multilayer coating and the oxide semiconductor layer.

10. The system of claim 7, wherein the source of coherent radiation includes a means for emitting a visible HeNe laser beam, and wherein the second multilayer coating partially reflects the visible HeNe laser beam.

11. A micromanipulator system, including:

a source of coherent radiation; and a beam combining optic positioned to receive the coherent radiation, and comprising a substrate having a front surface and a coating on the front surface, wherein the substrate is substantially transparent to visible radiation, wherein the coating includes an oxide semiconductor layer, and wherein the oxide semiconductor layer is highly reflective to a selected infrared wavelength and substantially transparent to visible radiation, wherein the selected infrared wavelength is 10.6 micrometers.

12. A dichroic optical filter, including:

a substrate that is substantially transparent to visible radiation, wherein the substrate has a front surface;

a coating on the front surface, wherein the coating includes:

an oxide semiconductor layer that has a reflectivity of more than 50% to a selected infrared wavelength and is substantially transparent to visible radiation; and a first multilayer coating for enhancing the filter's reflectance to the selected infrared wavelength, wherein the first multilayer coating includes thick layers having a higher refractive index alternating with thick layers having a lower refractive index, wherein each of the thick layers has an optical thickness substantially equal to one quarter of the selected infrared wavelength, and wherein each of the thick layers is substantially transparent to visible radiation, and wherein the combined reflectivity of the first multilayer coating and the oxide semiconductor layer to the selected infrared wavelength is substantially equal to at least 90%.

13. A micromanipulator system, including:

a source of coherent radiation; and a beam combining optic positioned to receive the coherent radiation, and comprising a substrate having a front surface and a coating on the front surface, wherein the substrate is substantially transparent to visible radiation, wherein the coating includes an oxide semiconductor layer, wherein the oxide semiconductor layer has a reflectivity of more than 50% to a selected infrared wavelength and is substantially transparent to visible radiation, and wherein the coating also includes a first multilayer coating for enhancing the reflectance of the beam combining optic to the selected infrared wavelength, wherein the first multilayer coating includes thick layers having a higher refractive index alternating with thick layers having a lower refractive index, wherein each of the thick layers has an optical thickness substantially equal to one quarter of the selected infrared wavelength, and wherein each of the thick layers is substantially transparent to visible radiation, and wherein the combined reflectivity of the first multilayer coating and the oxide semiconductor layer to the selected infrared wavelength is substantially equal to at least 90%.

* * * * *

UNITED STATES PATENT AND TRADEMARK OFFICE
CERTIFICATE OF CORRECTION

PATENT NO. : 5,296,961
DATED     : March 22, 1994
INVENTOR(S): David Trost; Philip Baumeister; and Dennis Fischer It is certified that error appears in the above - identified patent and that said Letters Patent is hereby corrected as shown below:

Column 5, line 66, change "26 wavelengths" to --26 quarter wavelengths--.

Signed and Sealed this

Sixteenth Day of August, 1994

Attest:

BRUCE LEHMAN

Attesting Officer

*Commissioner of Patents and Trademarks*